United States Patent
Horn (10) Patent No.: US 9,268,701 B1
(45) Date of Patent: Feb. 23, 2016

(54) CACHING OF DATA IN DATA STORAGE SYSTEMS BY MANAGING THE SIZE OF READ AND WRITE CACHE BASED ON A MEASUREMENT OF CACHE RELIABILITY

(75) Inventor: Robert L. Horn, Yorba Linda, CA (US)

(73) Assignee: Western Digital Technologies, Inc., Irvine, CA (US)

(*) Notice: Subject to any disclaimer, the term of this patent is extended or adjusted under 35 U.S.C. 154(b) by 1129 days.

(21) Appl. No.: 13/301,594

(22) Filed: Nov. 21, 2011

(51) Int. Cl.
- G06F 12/00 (2006.01)
- G06F 13/00 (2006.01)
- G06F 13/28 (2006.01)
- G06F 3/06 (2006.01)
- G06F 12/08 (2006.01)

(52) U.S. Cl.
CPC ............ *G06F 12/0871* (2013.01); *G06F 3/061* (2013.01); *G06F 3/068* (2013.01); *G06F 3/0616* (2013.01); *G06F 3/0614* (2013.01); *G06F 3/0685* (2013.01); *G06F 12/0848* (2013.01); *G06F 2212/217* (2013.01); *G06F 2212/222* (2013.01)

(58) Field of Classification Search
None
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,016,530 A | 1/2000 | Auclair et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,725,342 B1 | 4/2004 | Coulson | |
| 6,754,021 B2 | 6/2004 | Kisaka et al. | |
| 6,785,767 B2 | 8/2004 | Coulson | |
| 6,807,630 B2 | 10/2004 | Lay et al. | |
| 6,856,556 B1 | 2/2005 | Hajeck | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,126,857 B2 | 10/2006 | Hajeck | |
| 7,136,973 B2 | 11/2006 | Sinclair | |
| 7,142,385 B2 | 11/2006 | Shimotono et al. | |
| 7,308,531 B2 | 12/2007 | Coulson | |
| 7,334,082 B2 | 2/2008 | Grover et al. | |
| 7,356,651 B2 | 4/2008 | Liu et al. | |
| 7,395,452 B2 | 7/2008 | Nicholson et al. | |
| 7,411,757 B2 | 8/2008 | Chu et al. | |

(Continued)

OTHER PUBLICATIONS

U.S. Appl. No. 12/720,568, filed Mar. 9, 2010, 22 pages.

(Continued)

*Primary Examiner* — Jared Rutz
*Assistant Examiner* — Marwan Ayash (57) ABSTRACT

A disk drive is disclosed that varies its caching policy for caching data in non-volatile solid-state memory as the memory degrades. As the non-volatile memory degrades, the caching policy can be varied such that the non-volatile memory is used more as a read cache and less as a write cache. Performance improvements and slower degradation of the non-volatile memory can thereby be attained.

17 Claims, 6 Drawing Sheets

(56) References Cited

U.S. PATENT DOCUMENTS

| | | |
|---|---|---|
| 7,424,577 B2 | 9/2008 | Bali et al. |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,596,643 B2 | 9/2009 | Merry, Jr. et al. |
| 7,610,438 B2 | 10/2009 | Lee et al. |
| 7,613,876 B2 | 11/2009 | Bruce et al. |
| 7,631,142 B2 | 12/2009 | Nishide et al. |
| 7,634,585 B2 | 12/2009 | Conley et al. |
| 7,644,231 B2 | 1/2010 | Recio et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,725,661 B2 | 5/2010 | Liu et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,831,634 B2 | 11/2010 | Petev et al. |
| 7,861,038 B2 | 12/2010 | Fontenot et al. |
| 7,898,855 B2 | 3/2011 | Merry, Jr. et al. |
| 7,912,991 B1 | 3/2011 | Merry et al. |
| 7,934,053 B2 | 4/2011 | Chen et al. |
| 7,936,603 B2 | 5/2011 | Merry, Jr. et al. |
| 7,962,685 B2 | 6/2011 | Cheung et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2001/0018728 A1 | 8/2001 | Topham et al. |
| 2005/0125614 A1 | 6/2005 | Royer, Jr. |
| 2005/0172082 A1 | 8/2005 | Liu et al. |
| 2005/0251617 A1 | 11/2005 | Sinclair et al. |
| 2006/0080501 A1 | 4/2006 | Auerbach et al. |
| 2006/0143360 A1 | 6/2006 | Petev et al. |
| 2006/0143427 A1 | 6/2006 | Marwinski et al. |
| 2006/0195657 A1 | 8/2006 | Tien et al. |
| 2006/0248124 A1 | 11/2006 | Petev et al. |
| 2006/0248387 A1 | 11/2006 | Nicholson et al. |
| 2007/0174546 A1 | 7/2007 | Lee |
| 2007/0220202 A1 | 9/2007 | Sutardja et al. |
| 2007/0288692 A1 | 12/2007 | Bruce et al. |
| 2008/0005462 A1 | 1/2008 | Pyeon et al. |
| 2008/0040537 A1 | 2/2008 | Kim |
| 2008/0059694 A1 | 3/2008 | Lee |
| 2008/0130156 A1 | 6/2008 | Chu et al. |
| 2008/0141054 A1 | 6/2008 | Danilak |
| 2008/0141055 A1 | 6/2008 | Danilak |
| 2008/0177938 A1 | 7/2008 | Yu |
| 2008/0209114 A1 | 8/2008 | Chow et al. |
| 2008/0215800 A1 | 9/2008 | Lee et al. |
| 2008/0222353 A1 | 9/2008 | Nam et al. |
| 2008/0244164 A1 | 10/2008 | Chang et al. |
| 2008/0256287 A1 | 10/2008 | Lee et al. |
| 2008/0294846 A1 | 11/2008 | Bali et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0043831 A1 | 2/2009 | Antonopoulos et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | McKean et al. |
| 2010/0088459 A1 | 4/2010 | Arya et al. |
| 2010/0115197 A1* | 5/2010 | Lee et al. .............. 711/113 |
| 2010/0169604 A1 | 7/2010 | Trika et al. |
| 2010/0174849 A1 | 7/2010 | Walston et al. |
| 2010/0250793 A1 | 9/2010 | Syu |
| 2010/0268881 A1 | 10/2010 | Galchev et al. |
| 2011/0047437 A1* | 2/2011 | Flynn ................. 714/758 |
| 2011/0066808 A1* | 3/2011 | Flynn et al. ............ 711/118 |
| 2011/0082985 A1 | 4/2011 | Haines et al. |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |

(56) References Cited

U.S. PATENT DOCUMENTS

| | | | |
|---|---|---|---|
| 2014/0136753 | A1 | 5/2014 | Tomlin et al. |
| 2014/0149826 | A1 | 5/2014 | Lu et al. |
| 2014/0157078 | A1 | 6/2014 | Danilak et al. |
| 2014/0181432 | A1 | 6/2014 | Horn |
| 2014/0223255 | A1 | 8/2014 | Lu et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "Sail: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

William B. Boyle, et al., U.S. Appl. No. 13/105,785, filed May 11, 2011, 19 pages.

* cited by examiner

CACHING OF DATA IN DATA STORAGE SYSTEMS BY MANAGING THE SIZE OF READ AND WRITE CACHE BASED ON A MEASUREMENT OF CACHE RELIABILITY

BACKGROUND

1. Technical Field

This disclosure relates to disk drives, including but not limited to hybrid hard drives. More particularly, the disclosure relates to systems and methods for caching data in solid-state memory of a disk drive.

2. Description of the Related Art

Non-volatile memory devices typically provide better performance for reading and writing data than magnetic media. Accordingly, in storage devices it is advantageous to utilize non-volatile memory for storing data. However, a problem with using non-volatile memory for storing data is that reliability of non-volatile memory degrades over time.

Non-volatile memory devices can typically endure a limited number of write cycles over their useful life. Various factors can contribute to data errors in non-volatile memory devices, which include charge loss or leakage over time, read disturb, and device wear caused by program-erase cycles. Non-volatile memory degradation can cause stored data to be corrupted. For example, when the number of bit errors on a read operation exceeds the ECC (error correction code) correction's capability of the non-volatile memory device, a read operation fails.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Non-volatile memory devices (NVM) (e.g., flash memory and other types of solid-state memory devices) store information in an array of memory cells. In single-level cell (SLC) non-volatile memory, each cell stores a single bit of information. In multi-level cell (MLC) non-volatile memory, each cell stores two or more bits of information. Non-volatile memory has a limited usable life that is measured by the number of times data can be written to a specific NVM location. As NVM wear increases (e.g., number of program-erase cycles increases), the reliability and data retention of the NVM decreases. MLC non-volatile memory (e.g., MLC NAND) is cheaper than SLC non-volatile memory, but tends to have slower access time, lower endurance, and lower data retention.

To improve performance, some disk drives take advantage of the speed of non-volatile memory to store certain data in non-volatile memory. This data can include frequently accessed data and data accessed at start-up. Disk drives that comprise non-volatile memory cache in addition to magnetic storage are referred to as "hybrid hard disk drives" or "hybrid hard drives" throughout this disclosure. In some hybrid hard drives, MLC NVM can be a good choice for cache storage due to its low cost and high storage density. Non-volatile memory is typically used both as read cache (e.g., a copy of data exists in magnetic storage) and write cache (e.g., data stored in NVM cache is the most recent version than data stored in magnetic storage).

In some embodiments of the present invention, a caching policy of a hybrid hard drive is varied as the NVM wears out such that a larger portion of the NVM is used as read cache and a smaller portion of the NVM is used as write cache. In some embodiments, when the reliability (e.g., retention) of the NVM device falls below a minimum threshold, the non-volatile memory is used exclusively as a read cache. In this mode, hybrid hard drives continue to derive a performance advantage from the NVM, but if a NVM read operation fails, no user data is lost since an identical copy can be read from the magnetic storage. In some embodiments, varying the caching policy allows the hybrid hard drive to continue providing improved performance as the NVM nears the end of its usable life because the NVM can still be used for storing frequently read data. In addition, storing data in the non-volatile memory can result in improved power consumption.

System Overview

Figure 1:
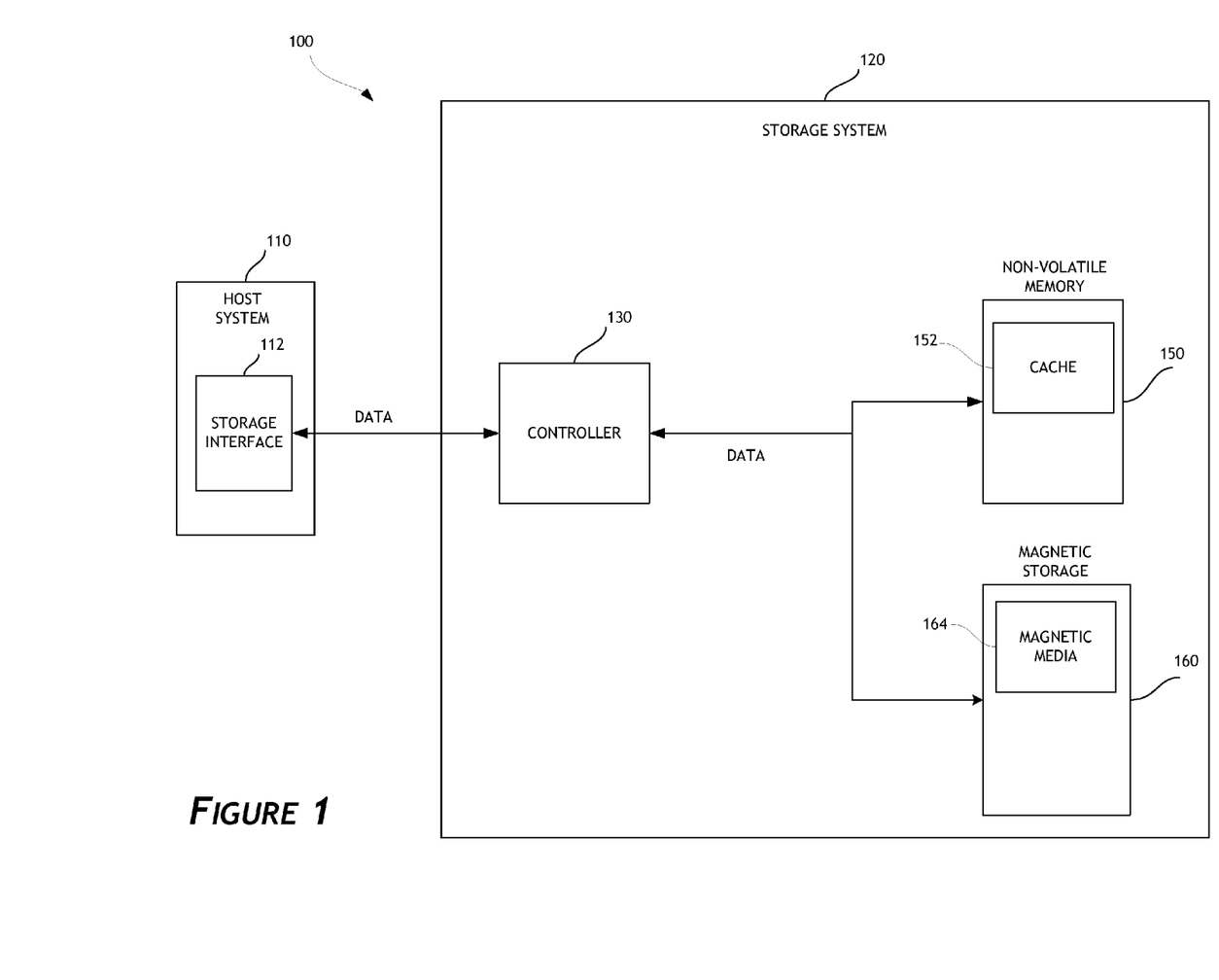
FIG. 1 is a block diagram illustrating a storage device that implements improved caching mechanisms in accordance with one embodiment of the invention.

FIG. 1 illustrates a storage system 100 that implements improved caching mechanisms in accordance with one embodiment of the invention. As shown, a storage system 120 (e.g., a hybrid hard drive) includes a controller 130, non-volatile storage memory module 150, which comprises cache 152, and magnetic storage module 160, which comprises magnetic media 164 (e.g., a magnetic disk). The non-volatile memory module 150 can comprise one or more non-volatile solid-state memory arrays. The controller 130 can be configured to receive data and/or storage access commands from a storage interface module 112 (e.g., a device driver) in a host system 110. Storage access commands communicated by the storage interface 112 can include write and read commands issued by the host system 110. Read and write commands can specify a logical block address in the storage system. The controller 130 can execute the received commands in the non-volatile memory module 150 or in the magnetic storage module 160. In one embodiment, the controller can include memory (e.g., DRAM) for storing data, such as system tables.

The non-volatile memory module 150 is preferably implemented using NAND flash memory devices. Other types of solid-state memory devices can alternatively be used, including flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. In one embodiment, the memory devices are preferably MLC devices, although SLC memory devices, or a combination of SLC and MLC devices may be used in some embodiments.

Storage system 120 can store data communicated by the host system 110. That is, the storage system 120 can act as memory storage for the host system 110. To facilitate this function, the controller 130 can implement a logical interface. Logical interface can present to the host system 110 storage system's memory as a set of logical addresses (e.g., contiguous address) where data can be stored. Internally, the controller 130 can map logical addresses to various physical memory addresses in the magnetic media 164 and/or the non-volatile memory module 150.

In one embodiment, at least a portion of the non-volatile memory module 150 can be used as cache 152. In another embodiment, entire non-volatile memory module 150 can be used as cache. The controller 130 can store data communicated by the host system 110 in the non-volatile memory. In one embodiment, non-volatile memory cache 152 can be used as a read cache and/or a write cache. When the non-volatile memory is used as a read cache, a copy of data also exists in the magnetic storage 160. When non-volatile memory is used as a write cache, data stored in non-volatile memory is a more recent version than data stored in the magnetic storage 160. To improve performance of the storage system 120 and/or host system 110, in some embodiments, various types of data can be stored in non-volatile memory cache, including frequently accessed data, data accessed at start-up (e.g., following a reset or power down), system data, sequentially accessed data, etc.

Variable Caching Policy

Figure 2:
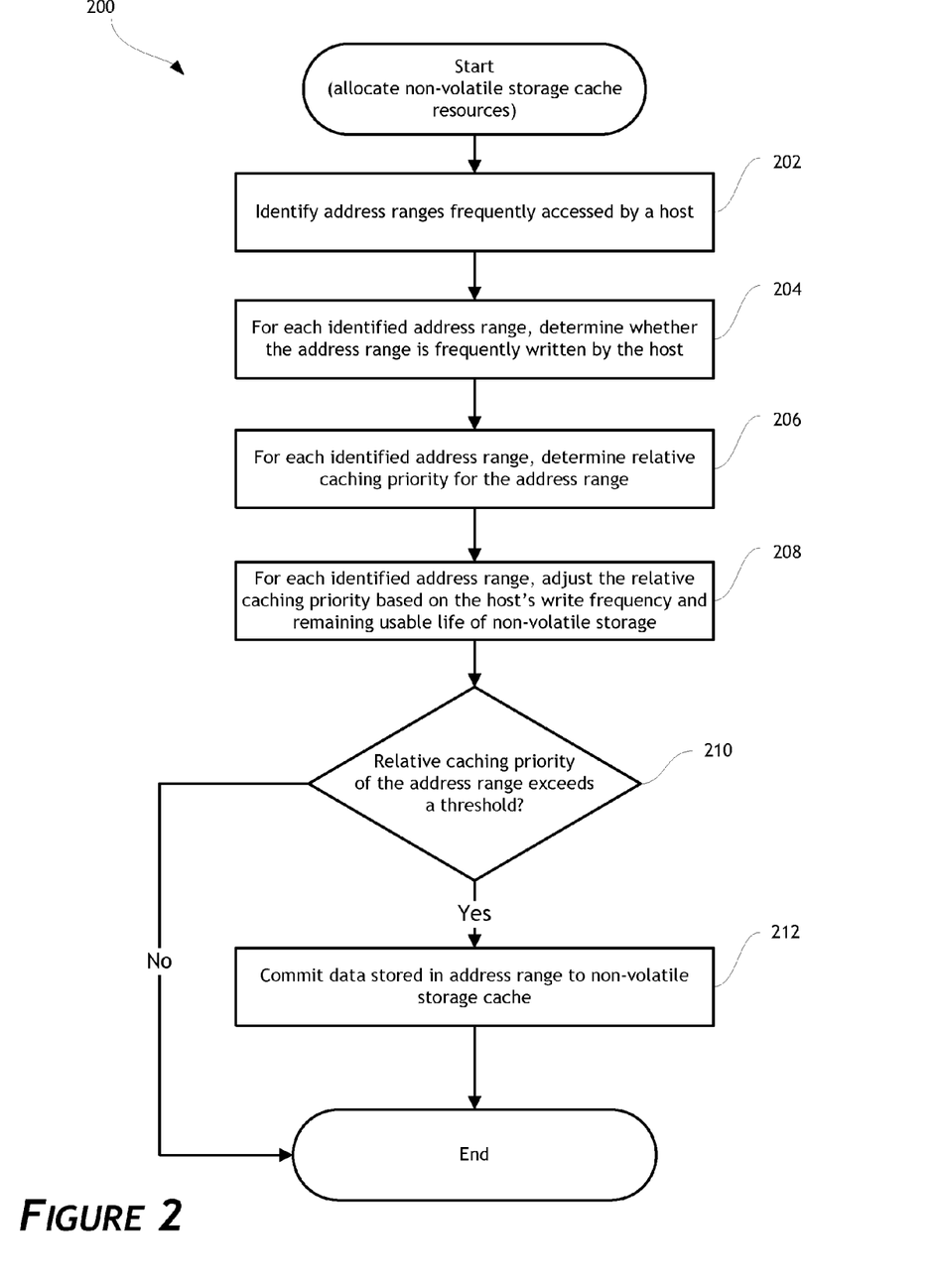
FIG. 2 is a flow diagram illustrating improved caching mechanisms in accordance with one embodiment of the invention.

FIG. 2 illustrates improved caching mechanisms in accordance with one embodiment of the invention. The process 200 can be implemented by the controller 130 of a storage system 120, such as a hybrid disk drive. The process 200 starts in block 202, where a set of address ranges (e.g., logical address ranges of the storage system) frequently accessed by the host system are identified. In one embodiment, frequency of access can be determined by maintaining a list of access frequencies and sorting the list to determine address ranges having the highest access frequencies. For example, the list of access frequencies can comprise access counts, which are incremented upon receiving a read and write commands communicated by the host system 110. The list of access frequencies can be sorted and frequently accessed address ranges can be determined by comparing access counts to an access frequency threshold. Frequently accessed address ranges can be identified as those address ranges that are accessed in excess of the access frequency threshold. As another example, the list of access frequencies can be sorted and a portion of highest frequently accessed ranges (e.g., top 5%, 10%, 15%, etc.) can be identified as frequently accessed ranges. In one embodiment, the list of access frequencies is maintained in a sorted order.

In block 204, the process determines which of the address ranges from the set identified in block 202 are frequently written by the host system. In one embodiment, frequency of writing can be determined by maintaining a list of write access frequencies. For example, the list of write access frequencies can comprise write access counts, which are incremented upon receiving write commands communicated by the host system 110. The list of write access frequencies can be sorted and frequently written address ranges can be determined by comparing write access counts to a write access frequency threshold, which can be the same or different value than the access frequency threshold. Frequently written address ranges can be identified as those address ranges that are written in excess of the write access frequency threshold. As another example, the list of write access frequencies can be sorted and a portion of highest frequently accessed ranges (e.g., top 5%, 10%, 15%, etc.) can be identified as frequently written ranges. In one embodiment, the list of write access frequencies is maintained in a sorted order.

In block 206, the process determines the relative caching priority of each address range identified in block 202. In one embodiment, the process determines a metric (score) corresponding to the frequency of access identified in block 202. This is described in co-pending patent application Ser. No. 13/301,543y, entitled "DISK DRIVE DATA CACHING USING A MULTI-TIERED MEMORY," the disclosure of which is hereby incorporated by reference in its entirety. In one embodiment, the metric (score) can correspond to the number of access commands (e.g., read and write commands) issued by the host system to the address range.

In block 208, based on the write frequency identified in block 204 and on the remaining usable life of the non-volatile memory, the process adjusts the relative caching priority determined in block 206. In one embodiment, the write frequency is compared to a threshold and the relative caching priority is decreased if the threshold is exceeded. The threshold can correspond to the remaining usable life of the non-volatile memory.

In one embodiment, the remaining usable life can correspond to the number of remaining program-erase cycles that the NVM can endure. For example, certain types of NAND NVM can endure between 3,000 and 100,000 program-erase cycles. In another embodiment, the remaining usable life (or reliability measure) can be determined based partly or wholly on the total number of bytes that have been written to non-volatile memory.

In one embodiment, the remaining usable life (or reliability measure) can be determined based partly or wholly on a number of errors encountered when reading data stored in non-volatile memory. Non-volatile memory can degrade and wear out, which can cause corruption of stored data. With NAND flash memory, for example, data corruption can be caused by a program disturb (e.g., data not intended to be programmed is nonetheless changed by a program operation directed to adjacent NVM blocks), read disturb (e.g., data not intended to be read is changed by a read operation directed to adjacent NVM pages), data loss (e.g., charge loss over an extended storage period), etc. Various error correction code (ECC) mechanisms can be used for detecting and correcting data corruption. In one embodiment, the number of bit corruptions detected and/or fixed by the ECC mechanism can be monitored during the execution of read operations. The number of bit corruptions can provide a measure of remaining usable life of non-volatile memory. This measure can be determined, for example, by comparing the average number of bits corruptions to a set of tiered thresholds.

The remaining usable life (or reliability measure) can also be determined based partially or wholly on voltage threshold levels or voltage reference values selected or determined when reading data from MLC flash memory. The remaining usable life can correspond to a voltage threshold level selected from a range of possible threshold levels during reading data so that data errors are reduced or minimized. In another embodiment, the remaining usable life can correspond to the adjustment of programming algorithm parameters (e.g., programming time, erase time, etc.) when storing data in non-volatile memory.

In one embodiment, the remaining usable life can be determined by a signal processing subsystem. The non-volatile memory module 150 can include a bridge device coupled with non-volatile memory module via an interface such as ONFI. The bridge device can be further configured to communicate with the controller 130 over a high speed interface such as PCIe and to provide to the controller physical, page-level access/control to non-volatile memory. The bridge device can perform basic signal processing and channel management of non-volatile memory. This architecture is described in a co-pending patent application Ser. No. 13/226, 393, entitled "SYSTEMS AND METHODS FOR AN ENHANCED CONTROLLER ARCHITECTURE IN DATA STORAGE SYSTEMS," filed Sep. 6, 2011, the disclosure of which is hereby incorporated by reference in its entirety. In other embodiments, a bridge device may not be used and the non-volatile memory module 150 may be managed directly by the controller 130.

In block 210, the process determines whether the adjusted relative caching priority determined in block 208 exceeds a threshold. In one embodiment, the threshold can correspond to the lowest relative caching priority of an entry that is already stored in the NVM. In another embodiment, a predetermined threshold can be used. In another embodiment, the threshold can be adjusted (e.g., decreased or increased) based on the remaining usable life of the non-volatile memory. If the threshold is exceeded, the process transitions to block 212 where it writes data to the non-volatile memory. Data can correspond to data stored in the address range identified in block 204. If the threshold is not exceeded, the process 200 returns to block 204, where the next address range from the set is processed. Similarly, the process 200 returns to block 204 after storing data in 212. In one embodiment, the process terminates when there are no more remaining address ranges in the set identified in block 202.

Candidate Lists

Figure 3:
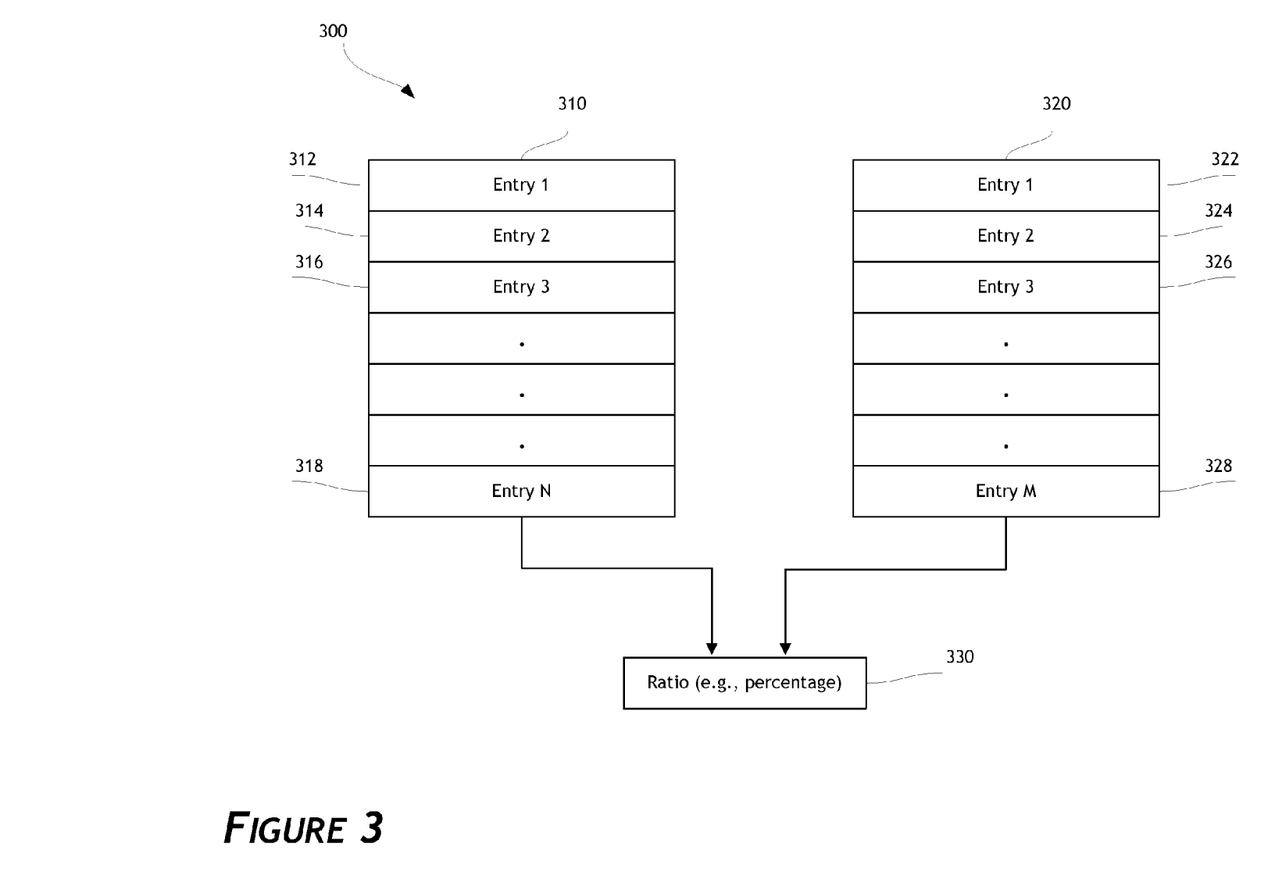
FIG. 3 is a flow diagram illustrating improved caching mechanisms in accordance with another embodiment of the invention.

In some embodiments, data corresponding to address ranges that are frequently accessed can be placed in one or more candidate lists. FIG. 3 illustrates a flow diagram 300 of improved caching mechanisms in accordance with another embodiment of the invention. As is illustrated, two candidate lists 310 and 320 are maintained. List 310 stores data that is frequently read by the host system and list 320 stores data that is frequently written by the host system. Entries 312, 314, 316, and 318 of the list 310 stores frequently read data that corresponds to various address ranges. For example, entry 312 stores data that corresponds to frequently read address range X, entry 314 stores data that corresponds to frequently read address range Y, etc. Entries 312, 314, 316, and 318 stores data along with information identifying each corresponding address range. In one embodiment, the lists 310 and 320 are mutually exclusive, that is, they have no common entries. In other words, an entry can be either in list 310 or 320, but not in both lists.

Similarly, entries 322, 324, 326, and 328 of the list 320 stores frequently written data corresponding to various address ranges. For example, entry 322 stores data that corresponds to frequently read address range A, entry 324 stores data that corresponds to frequently read address range B, etc. Entries 322, 324, 326, and 328 stores data along with information identifying each corresponding address range.

In block 330, the process 300 selects a ratio of entries from candidate lists 310 and 320 that are written to non-volatile memory. For example, the ratio can be selected such that 40% of frequently written data is stored in the non-volatile memory. Accordingly, and the process 300 selects two entries from the candidate list 320 for every five entries selected from the candidate list 310. The ratio of block 330 is adjusted based on the remaining usable life of non-volatile memory. Thus, the portion of non-volatile memory used for storing frequently read data is increased in relation to the portion used for storing frequently written data.

In one embodiment, entries in the candidate lists can be ordered according to their relative caching priorities determined in block 206 of FIG. 2. Entries are selected according to the relative caching priority. For example, entries with higher relative caching priorities are selected and written to non-volatile memory before entries with lower relative caching priorities are selected and written.

Caching Policy Adjustment

In some embodiments, selecting the ratio in block 330 of FIG. 3 or adjusting the relative threshold in block 208 of FIG. 2 can be performed according to the following policies.

Figure 4:
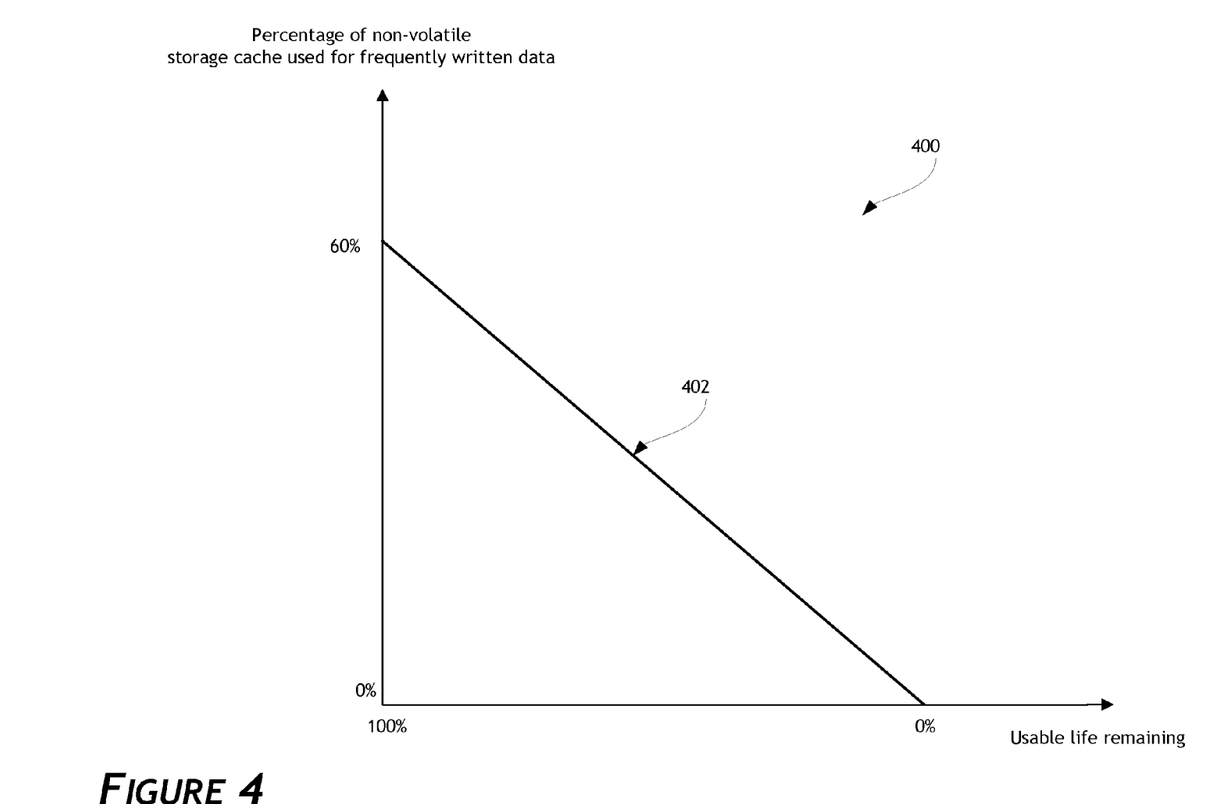
FIGS. 4-6 illustrate several caching policy adjustments in accordance with some embodiments of the invention.

FIG. 4 illustrates linear caching policy adjustment 400 in accordance with one embodiment of the invention. X-axis indicates the usable remaining life of non-volatile memory and y-axis indicates the ratio of non-volatile memory cache used for frequently written data. As is illustrated by line 402, the ratio starts at 60% when substantially full life of non-volatile memory remains and is decreased linearly as the usable remaining life of non-volatile memory decreases.

Figure 5:
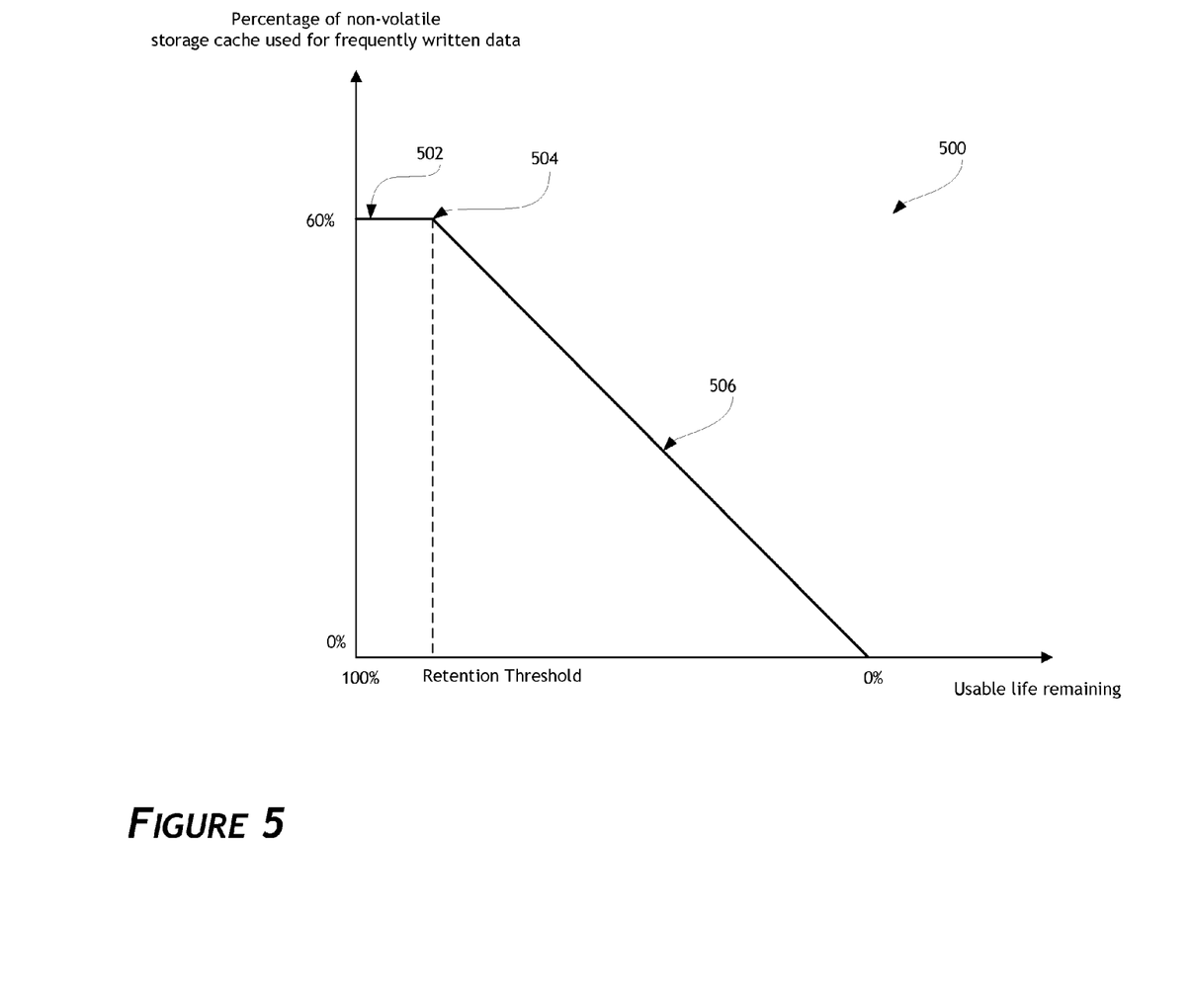

FIG. 5 illustrates piecewise linear caching policy adjustment 500 in accordance with another embodiment of the invention. X-axis indicates the usable remaining life of non-volatile memory and y-axis indicates the ratio of non-volatile memory cache used for frequently written data. As is illustrated by line 502, the ratio starts at 60% when substantially full life of non-volatile memory remains and continues to stay at 60% until a retention threshold is reached at 504. At this point, as is illustrated by line 506, the ratio is decreased linearly as the usable remaining life of non-volatile memory decreases.

Figure 6:
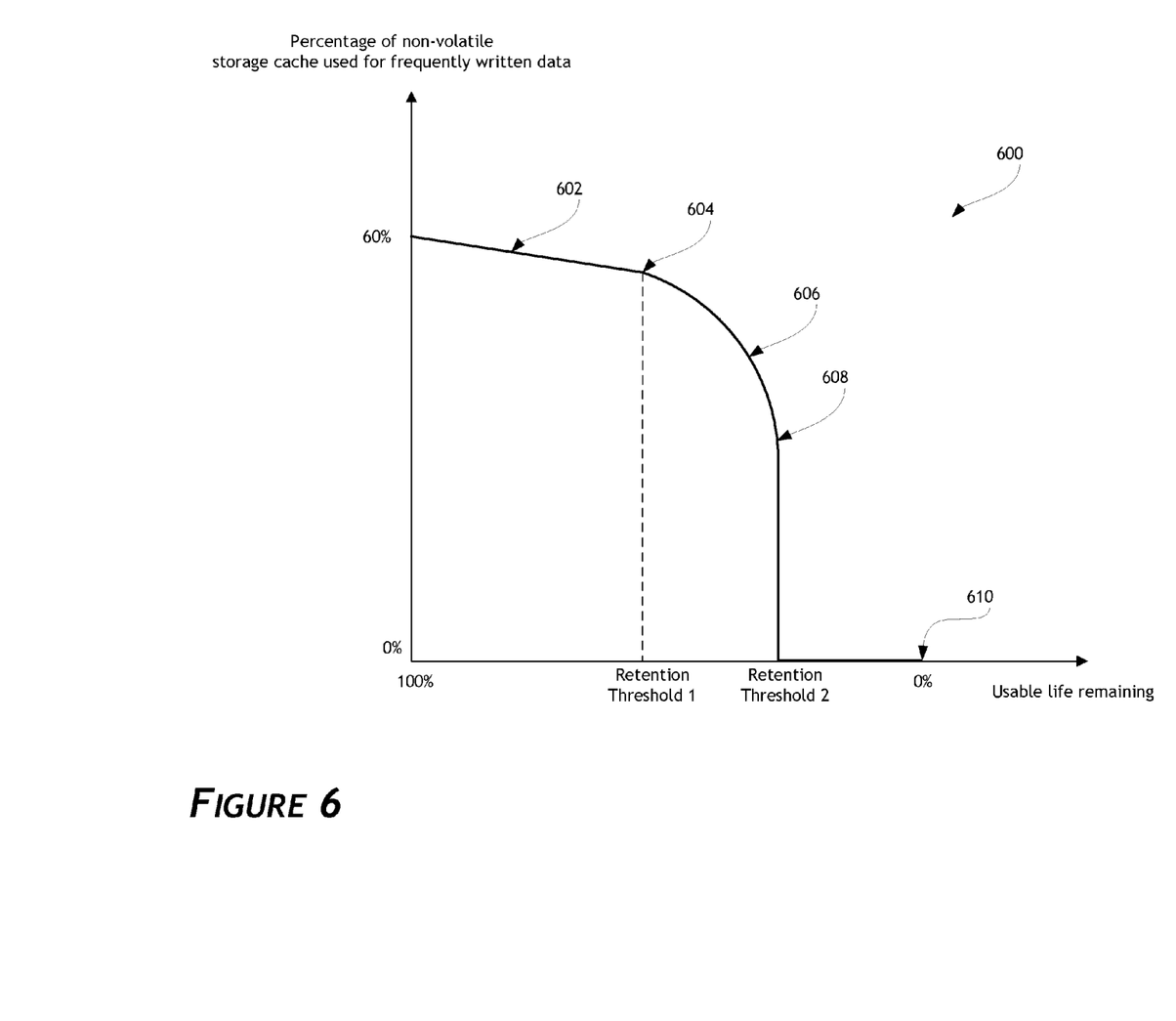

FIG. 6 illustrates non-linear caching policy adjustment 600 in accordance with another embodiment of the invention. X-axis indicates the usable remaining life of non-volatile memory and y-axis indicates the ratio of non-volatile memory cache used for frequently written data. As is illustrated by line 602, the ratio starts at 60% when substantially full life of non-volatile memory remains and is decreased linearly as the usable remaining life of non-volatile memory decreases. When a first retention threshold 604 is reached, the ratio is being decreased according to a non-linear curve 606. When a second retention threshold 608 is reached, the ratio is set to zero. That is, no frequently written data is stored in non-volatile memory, and the entire non-volatile memory cache is used to store frequently read data. The ratio stays at zero until the end of non-volatile memory's usable life is reached in 610.

In another embodiment, caching policy can be adjusted according to a characterization of data stored in non-volatile memory. For example, at least some frequently written data stored in the non-volatile memory cache can be determined to be important to the overall performance of the storage and/or host systems. In such case, the policy may be adjusted in accordance with the goal of retaining this type of frequently written data in non-volatile memory. As another example, a portion of non-volatile memory cache can be reserved for certain data, such as data accessed at system start-up.

CONCLUSION

In some embodiments, varying a caching policy allows hybrid hard drives to improve performance by utilizing non-volatile memory throughout its entire usable life. As the non-volatile memory degrades (e.g., looses data retention), caching policy can be varied to store less frequently written data and more frequently read data. Accordingly, hybrid hard drives can continue to utilize non-volatile memory for caching even as retention of non-volatile memory degrades. The ratio of frequently written and frequently read data stored in non-volatile memory can be adjusted as non-volatile memory degrades. Toward the end of usable life of non-volatile memory, the caching policy can be adjusted to store frequently read data in non-volatile memory. Accordingly, performance improvements and slower degradation of non-volatile memory can be attained.

Other Variations

As used in this application, "non-volatile memory" typically refers to solid-state memory such as, but not limited to, NAND flash. However, the systems and methods of this disclosure may also be useful in more conventional hard drives and hybrid hard drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of caching policies can be implemented. In addition, the actual steps taken in the processes shown in FIGS. 2-3 may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system for storing data received from a host, comprising:
   a non-volatile memory comprising at least a write cache portion and a read cache portion, the write cache portion configured to store data frequently written by the host relative to a write frequency threshold and the read cache portion configured to store data frequently read by the host relative to a read frequency threshold, wherein data frequently written by the host is identified by tracking a number of write commands issued by the host, wherein data frequently read by the host is identified by tracking a number of read commands issued by the host, and wherein initial sizes of the write and read cache portions are greater than zero; and
   a controller configured to communicate with at least the non-volatile memory in response to receiving read and write commands from the host, the controller further configured to:
   determine a reliability measurement of the non-volatile memory;
   determine a new size of the write cache portion based on linear and non-linear relationships between a size of the write cache portion and the reliability measurement of the non-volatile memory, the controller further configured to:
   while the reliability measurement is determined to be in a first reliability range, linearly decrease the new size of the write cache portion as the reliability measurement decreases, and
   while the reliability measurement is determined to be in a second reliability range, non-linearly decrease the new size of the write cache portion as the reliability measurement decreases,
   wherein the second reliability range is different from the first reliability range, and wherein the second reliability range corresponds to a lower reliability of the non-volatile memory than the first reliability range; and
   adjust the write cache portion to the new size.

2. The system of claim 1, wherein the new size is smaller than a current size of the write cache portion when a change in the reliability measurement indicates a degradation of reliability of the non-volatile memory.

3. The system of claim 2, wherein the controller is further configured to:
   reduce the size of the write cache portion by an amount equal to a difference between the current and new sizes of the write cache portion; and
   increase a size of the read cache portion by an amount equal to the difference.

4. The system of claim 1, wherein the reliability measurement corresponds at least in part to a number of remaining program-erase cycles of the non-volatile memory.

5. The system of claim 1, wherein when the reliability measurement falls below a minimum reliability of the non-volatile memory, the controller is further configured to:
   increase a size of the read cache portion by the a current size of the write cache portion; and
   set the new size of the write cache portion to zero.

6. The system of claim 1, wherein the controller is further configured to identify data frequently written by the host by tracking the number of write commands issued by the host to a first address of the non-volatile memory, and wherein the controller is further configured to identify data frequently read by the host by tracking the number of read commands issued to by the host to a second address of the non-volatile memory, the second address being same or different than the first address.

7. The system of claim 1, wherein the linear relationship between the size of the write cache portion and the reliability measurement of the non-volatile memory comprises a piecewise linear relationship between the size of the write cache portion and the reliability measurement of the non-volatile memory.

8. The system of claim 7, wherein the controller is further configured to:
   while the reliability measurement is determined to be in a first portion of the first reliability range, maintain a constant size of the write cache portion, and
   when the reliability measurement is determined to be in a second portion of the first reliability range, linearly decrease the new size of the write cache portion as the reliability measurement decreases, wherein the second portion of the first reliability range is different from the first portion of the first reliability range, and wherein the second portion of the first reliability range corresponds to a lower reliability of the non-volatile memory than the first portion of the first reliability range.

9. The system of claim 1, wherein the controller is further configured to:
track numbers of write commands issued by the host to a first plurality of addresses of the non-volatile memory;
sort the first plurality of addresses by the numbers of write commands; and
using the write frequency threshold, select from data associated with the sorted first plurality of addresses, a subset of data for storing in the write cache portion.

10. The system of claim 9, wherein the controller is further configured to:
track numbers of read commands issued by the host to a second plurality of addresses of the non-volatile memory;
sort the second plurality of addresses by the numbers of read commands; and
using the read frequency threshold, select from data associated with the sorted second plurality of addresses, a subset of data for storing in the read cache portion.

11. In a data storage system, a method for storing data received from a host, the method comprising:
storing in a write cache portion of a non-volatile memory data frequently written by the host relative to a write frequency threshold, wherein data frequently written by the host is identified by tracking a number of write commands issued by the host;
storing in a read cache portion of the non-volatile memory data frequently read by the host relative to a read frequency threshold, wherein data frequently read by the host is identified by tracking a number of read commands issued by the host, and wherein initial sizes of the write and read cache portions are greater than zero;
determining a reliability measurement of the non-volatile memory;
determining a new size of the write cache portion based on linear and non-linear relationships between a size of the write cache portion and the reliability measurement of the non-volatile memory, wherein determining the new size of the write cache portion further comprises:
while the reliability measurement is in a first reliability range, linearly decreasing the new size of the write cache portion as the reliability measurement decreases, and
while the reliability measurement is in a second reliability range, non-linearly decreasing the new size of the write cache portion as the reliability measurement decreases,
wherein the second reliability range is different from the first reliability range, and wherein the second reliability range corresponds to a lower reliability of the non-volatile memory than the first reliability range; and
adjusting the write cache portion to the new size,
wherein the method is performed under control of a controller of the data storage system.

12. The method of claim 11, further comprising:
determining a change in the reliability measurement;
wherein when the change in the reliability measurement indicates degradation of the reliability of the non-volatile memory, reducing the size of the write cache portion by an amount equal to a difference between a current size and the new sizes of the write cache portion; and
increasing a size of the read cache portion by an amount equal to the difference.

13. The method of claim 11, wherein when the reliability measurement falls below a minimum reliability of the non-volatile memory:
increasing a size of the read cache portion by a current size of the write cache portion; and
setting the new size of the write cache portion to zero.

14. The method of claim 11, wherein the linear relationship between the size of the write cache portion and the reliability measurement of the non-volatile memory comprises a piecewise linear relationship between the size of the write cache portion and the reliability measurement of the non-volatile memory, and wherein the method further comprises:
while the reliability measurement is determined to be in a first portion of the first reliability range, maintaining a constant size of the write cache portion, and
when the reliability measurement is determined to be in a second portion of the first reliability range, linearly decreasing the new size of the write cache portion as the reliability measurement decreases,
wherein the second portion of the first reliability range is different from the first portion of the first reliability range, and wherein the second portion of the first reliability range corresponds to a lower reliability of the non-volatile memory than the first portion of the first reliability range.

15. The method of claim 11, further comprising:
tracking numbers of write commands issued by the host to a first plurality of addresses of the non-volatile memory;
sorting the first plurality of addresses by the numbers of write commands; and
using the write frequency threshold, selecting from data associated with the sorted first plurality of addresses, a subset of data for storing in the write cache portion.

16. The method of claim 15, further comprising:
tracking numbers of read commands issued by the host to a second plurality of addresses of the non-volatile memory;
sorting the second plurality of addresses by the numbers of read commands; and
using the read frequency threshold, selecting from data associated with the sorted second plurality of addresses, a subset of data for storing in the read cache portion.

17. The method of claim 11, wherein the reliability measurement corresponds at least in part to a number of remaining program-erase cycles of the non-volatile memory.

* * * * *